United States Patent
Hao et al.

(10) Patent No.: US 9,780,362 B2
(45) Date of Patent: Oct. 3, 2017

(54) ELECTRODE HAVING A SELECTIVELY LOADED MATRIX AND METHOD OF MANUFACTURING

(71) Applicant: Nissan North America, Inc., Franklin, TN (US)

(72) Inventors: Xiaoguang Hao, Wixom, MI (US); Jessica Weber, Berkley, MI (US); Kenzo Oshihara, Farmington Hills, MI (US); Ying Liu, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 137 days.

(21) Appl. No.: 14/928,362

(22) Filed: Oct. 30, 2015

(65) Prior Publication Data

US 2017/0125797 A1    May 4, 2017

(51) Int. Cl.
| | |
|---|---|
| *H01M 4/04* | (2006.01) |
| *H01M 4/36* | (2006.01) |
| *H01M 4/38* | (2006.01) |
| *H01M 4/80* | (2006.01) |
| *H01M 4/133* | (2010.01) |
| *H01M 4/134* | (2010.01) |
| *H01M 4/587* | (2010.01) |
| *H01M 4/13* | (2010.01) |
| *H01M 4/139* | (2010.01) |
| *H01M 4/62* | (2006.01) |

(52) U.S. Cl.
CPC ......... *H01M 4/364* (2013.01); *H01M 4/0404* (2013.01); *H01M 4/13* (2013.01); *H01M 4/139* (2013.01); *H01M 4/386* (2013.01); *H01M 4/587* (2013.01); *H01M 4/808* (2013.01); *H01M 4/624* (2013.01)

(58) Field of Classification Search
CPC .... H01M 4/364; H01M 4/808; H01M 4/0404; H01M 4/386; H01M 4/587; H01M 4/13; H01M 4/139; H01M 4/624
See application file for complete search history.

(56) References Cited

U.S. PATENT DOCUMENTS

| | | |
|---|---|---|
| 7,000,297 B2 | 2/2006 | Frustaci et al. |
| 7,250,233 B2 | 7/2007 | Choi et al. |
| 7,553,584 B2 | 6/2009 | Chiang et al. |
| 7,972,537 B2 | 7/2011 | Meng et al. |
| 7,988,896 B2 | 8/2011 | Zhang et al. |
| 8,669,008 B2 | 3/2014 | Cho et al. |
| 8,920,978 B1 | 12/2014 | Gross et al. |
| 9,093,693 B2 | 7/2015 | Zhamu et al. |
| 2010/0297502 A1 | 11/2010 | Zhu et al. |
| 2011/0123866 A1 | 5/2011 | Pan et al. |
| 2012/0183856 A1 | 7/2012 | Cui et al. |
| 2013/0077515 A1 | 3/2013 | Jung et al. |
| 2014/0023920 A1 | 1/2014 | Yamazaki et al. |
| 2014/0045065 A1 | 2/2014 | Bao et al. |
| 2014/0057179 A1 | 2/2014 | Yushin et al. |
| 2014/0150855 A1* | 6/2014 | Inoue ................... C01G 23/047 136/254 |
| 2015/0221929 A1 | 8/2015 | Lu |
| 2015/0287982 A1* | 10/2015 | Shin ....................... H01M 4/366 429/219 |
| 2017/0047584 A1* | 2/2017 | Hwang ................ H01M 4/0471 |

FOREIGN PATENT DOCUMENTS

WO          9950921 A1    10/1999

* cited by examiner

*Primary Examiner* — Muhammad Siddiquee

(74) *Attorney, Agent, or Firm* — Young Basile Hanlon & MacFarlane, P.C.

(57) ABSTRACT

Electrodes made with a matrix selectively loaded with particular active particles provide uniform distribution and reduce issues due to particle expansion. The electrode has a current collector, a separator and a matrix having first pores having a first size and second pores having a second size, the first size being larger than the second size, the second pores being uniformly distributed throughout the matrix; first active particles deposited in the first pores, the first active particles having a first particle size smaller than the first pores and larger than the second pores; and second active particles deposited in the second pores, the second active particles having a second particle size smaller than the second pores.

18 Claims, 5 Drawing Sheets

ELECTRODE HAVING A SELECTIVELY LOADED MATRIX AND METHOD OF MANUFACTURING

TECHNICAL FIELD

This disclosure relates to an electrode having a selectively loaded matrix and methods of manufacturing the selectively loaded matrix and electrode.

BACKGROUND

Hybrid vehicles (HEV) and electric vehicles (EV) use chargeable-dischargeable power sources. Secondary batteries such as lithium-ion batteries are typical power sources for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithium-ion battery and low electric mileage per charge.

To increase the theoretical lithium storage capacity, silicon has been added to active materials. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

SUMMARY

Disclosed herein are electrodes having a matrix selectively loaded with particular active particles. One embodiment of an electrode disclosed herein has a current collector, a separator and a matrix having first pores having a first size and second pores having a second size, the first size being larger than the second size, the second pores being uniformly distributed throughout the matrix; first active particles deposited in the first pores, the first active particles having a first particle size smaller than the first pores and larger than the second pores; and second active particles deposited in the second pores, the second active particles having a second particle size smaller than the second pores.

Also disclosed are methods of making the electrodes having selectively loaded matrices. One method of preparing an electrode having selectively loaded active materials as disclosed herein comprises preparing a first slurry of first active particles having a first particle size and a second slurry of second active particles having a second particle size; selectively depositing the first active particles in a matrix by pulling the matrix through the first slurry, the matrix including first pores having a first size and second pores having a second size, the first size being larger than the second size, the second pores being uniformly distributed throughout the matrix, wherein the first particle size of the first active particles is smaller than the first pores and larger than the second pores; drying the matrix deposited with the first active particles; selectively depositing the second active particles in the matrix by pulling the matrix through the second slurry; and drying the matrix deposited with the first active particles and the second active particles.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Because the carbon material used in electrodes of conventional batteries, such as lithium ion batteries or sodium ion batteries, suffers from a low specific capacity, the conventional battery has poor energy density even though there is small polarization and good stability. Furthermore, batteries having electrodes of graphite or other carbon materials develop increased internal resistance over time, which decreases their ability to deliver current.

To address the poor energy density of carbon based electrodes, alternative active materials with higher energy densities are desired. Silicon, tin, germanium and their oxides and alloys are non-limiting examples of materials that may be added to an electrode active material layer to improve its energy density, among other benefits. One particular example is the use of silicon in lithium-ion batteries. Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon can cause particle cracking and pulverization when the silicon has no room to expand. This expansion can lead to electrode delamination, electrical isolation of the active material, capacity fade due to collapsed conductive pathways, and, like carbon based electrodes, increased internal resistance over time, which decreases their ability to deliver current.

Disclosed herein are electrodes formed with matrices that can be selectively loaded to uniformly distribute different active catalyst particles across the active material layer. This uniform distribution assists in countering the effects of the volume expansion of active particles with high lithium storage capacity, including agglomeration of the active particles upon expansion and contraction. The matrix in which the active particles are loaded reduces delamination, retains conductive pathways and assists in overall extending the life of a battery incorporating the electrodes disclosed herein.

Figure 1:
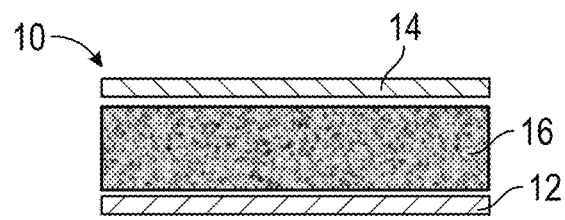
FIG. 1 is a cross sectional view of an embodiment of an electrode as disclosed herein.
Figure 6:
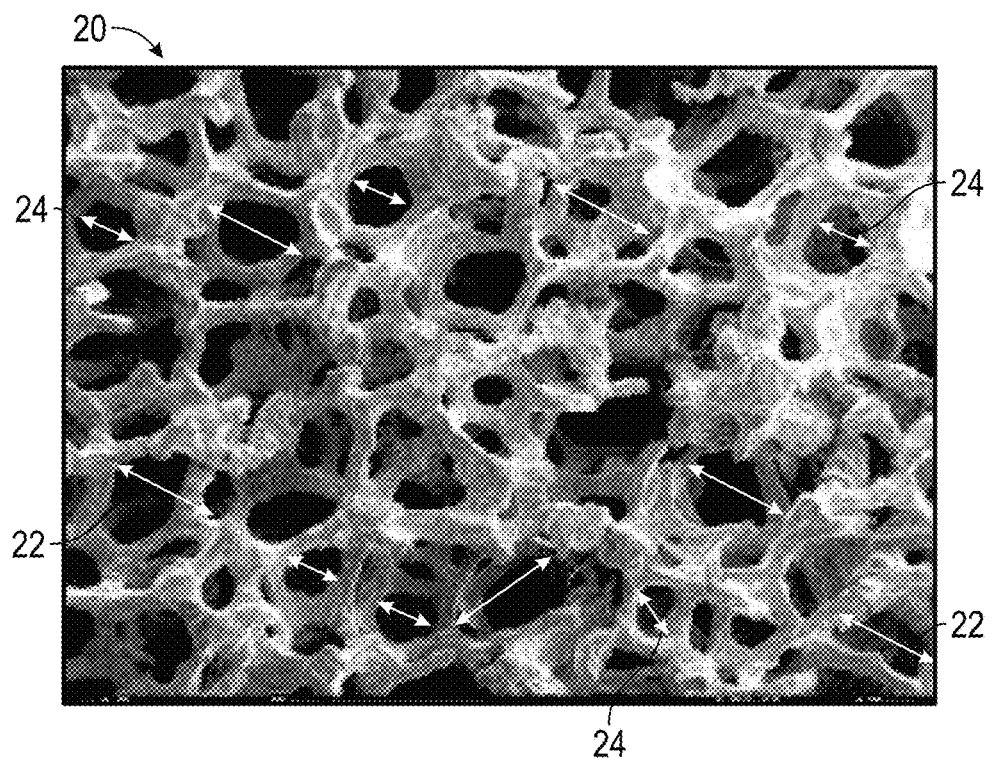
FIG. 6 is a schematic of a matrix used in the electrodes disclosed herein.
Figure 7:
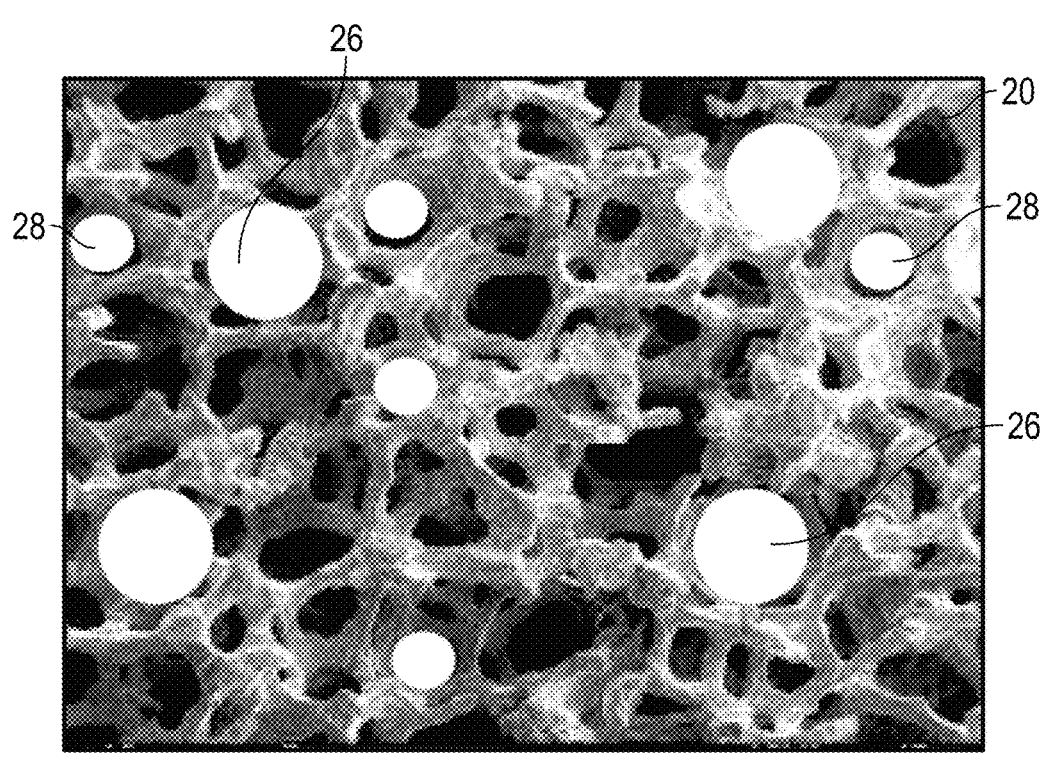
FIG. 7 is a schematic of the matrix illustrating partial active particle loading.

FIGS. 1-4 illustrate embodiments of the electrode disclosed herein. In FIG. 1, the electrode 10 has a current collector 12 and a separator 14. Between the current collector 12 and the separator 14 is an active material layer 16 having a matrix 20, illustrated in FIG. 6. The matrix 20 has first pores 22 having a first size and second pores 24 having a second size, the first size being larger than the second size, the second pores 24 being uniformly distributed throughout the matrix 20. As illustrated in FIG. 7, first active particles 26 are deposited in the first pores 22, the first active particles 26 having a first particle size smaller than the first pores 22 and larger than the second pores 24. Second active particles 28 are deposited in the second pores 24, the second active particles 28 having a second particle size smaller than the second pores 24.

As illustrated in FIG. 1, the active electrode layer 16 comprises the matrix 20, the first active particles 26 and the second active particles 28. Another embodiment of an electrode 30 is illustrated in FIG. 2, in which the matrix 20 forms the current collector and the first active particles 26 and the second active particles 28 form the active material layer, forming a dual purpose layer 32 in the electrode 30.

Figure 2:
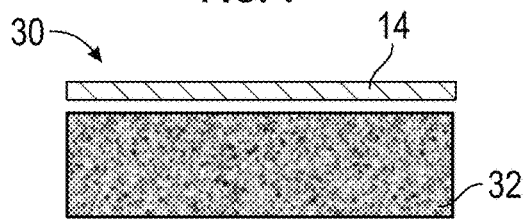
FIG. 2 is a cross sectional view of another embodiment of an electrode as disclosed herein.
Figure 3:
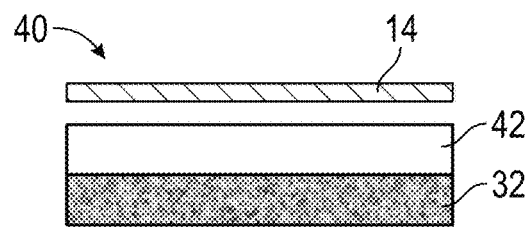
FIG. 3 is a cross sectional view of another embodiment of an electrode as disclosed herein.

Another embodiment of an electrode 40 is illustrated in FIG. 3, in which the dual purpose layer 32 of FIG. 2 includes a second active material layer 42 without a matrix layered onto the dual purpose layer 32. The second active material layer 42 can have the same active particles used in the dual purpose layer 32 or can be different active particles. As a non-limiting example, the first active particles 26 and second active particles 28 in the dual purpose layer 32 can be graphite and silicon, respectively, while the second active material layer 42 is graphite.

Figure 4:
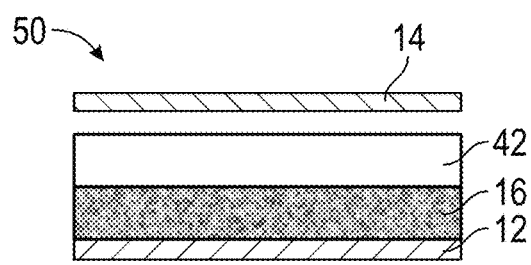
FIG. 4 is a cross sectional view of another embodiment of an electrode as disclosed herein.

Another embodiment of an electrode 50 is illustrated in FIG. 4, in which the active material layer 16 of FIG. 1, layered on the current collector 12, has the second active material layer 42 without a matrix layered onto the active material layer 16. The second active material layer 42 can have the same active particles used in the active material layer 16 or can be different active particles. As a non-limiting example, the first active particles 26 and second active particles 28 in the active material layer 16 can be graphite and silicon, respectively, while the second active material layer 42 is graphite. Depending on the material of the matrix 20 in FIG. 4, the current collector can comprise both the matrix within the active electrode layer 16 and the solid portion current collector 12.

Figure 5:
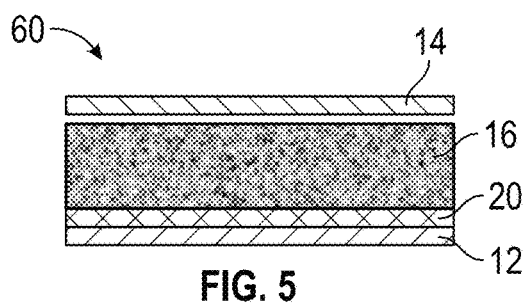
FIG. 5 is a cross sectional view of another embodiment of an electrode as disclosed herein.

Another embodiment of an electrode 60 is illustrated in FIG. 5, in which the active material layer 16 of FIG. 1 has a layer of matrix 20 without active particles between the active particle layer 16 and the current collector 12, essentially extending the current collector 12 to the matrix layer 20.

Each of the electrode embodiments described can further include carbon black deposited in voids in the matrix 20 after deposition of the first active particles 26 and the second active particles 28, along with a binder material. This ensures conductive contact between the active particles 26, 28. Non-limiting examples of the binder material include polyamide, polyvinylidene fluoride, polytetrafluoroethylene, styrene-butadiene rubber and carboxymethyl cellulose.

The electrodes herein can be used in any battery desired. As a non-limiting example, the electrodes herein may be anodes in a lithium ion battery, with the first active particles 26 being graphite and the second active particles being silicon 28. Other battery types and active material particles are contemplated.

Figure 11:
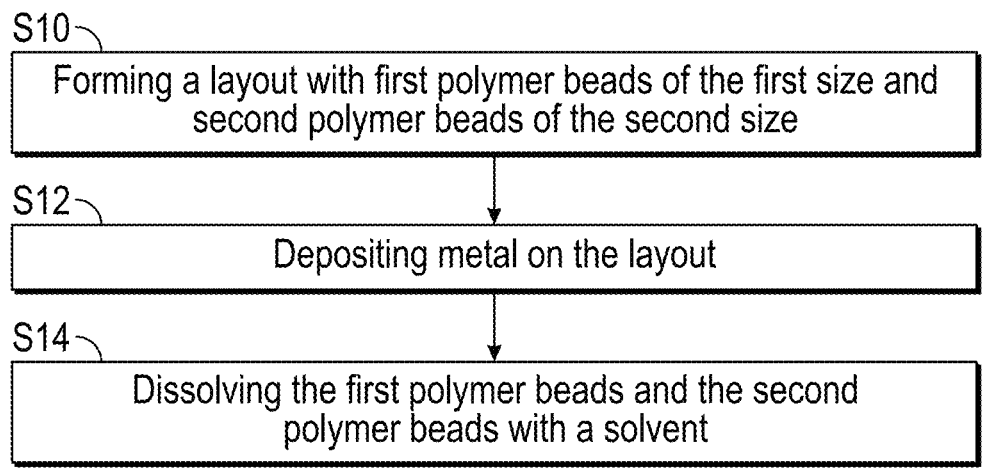
FIG. 11 is a flow diagram of a method of making the matrix disclosed herein.

The matrix 20 can be a metal foam, such as a nickel foam or a copper foam. The matrix 20 can be selectively made to have a desired ratio of first pore size to second pore size as desired or required. The first pore size and/or the second pore size can be created uniformly throughout the matrix 20, and concentrated regions and/or less concentrated regions can also be formed if desired or required. The matrix 20 can be made to have a single pore size or can be made to have more than two different pore sizes depending on the active particle loading desired or required. FIG. 11 is a flow diagram of one method of forming the matrix 20. In step S10, a layout is formed with first polymer beads of the first size, representing the first active particles 26, and second polymer beads of the second size representing the second active particles 28. As discusses above, if more than two particle sizes are desired, more than first and second polymer beads can be used to form the layout. In step S12, metal is deposited on the layout. The metal can be nickel or copper or another metal as desired or required. In step S14, the first polymer beads and the second polymer beads are dissolved with a solvent. The matrix is left behind with pores of the first size and the second size.

Figure 8:
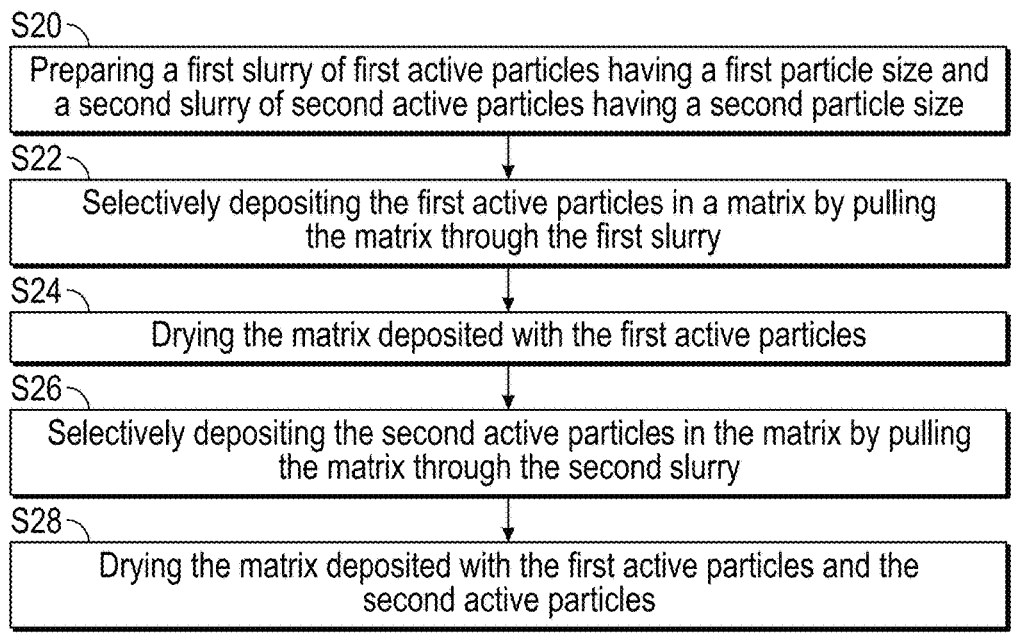
FIG. 8 is a flow diagram of a method of making the electrodes disclosed herein.

Also disclosed herein are methods of preparing the electrodes having selectively loaded active materials as illustrated in FIGS. 1-7. FIG. 8 is a flow diagram of one of the methods herein. In step S20, a first slurry of first active particles 26 having a first particle size is prepared, and a second slurry of second active particles 28 having a second particle size is prepared. The first active particles 26 are selectively deposited in the matrix 20 by pulling the matrix 20 through the first slurry in step S22. As discussed above, the matrix 20 was made to include first pores 22 having a first size and second pores 24 having a second size, the first size being larger than the second size. The second pores 24 are uniformly distributed throughout the matrix 20.

The first particle size of the first active particles 26 in the first slurry is smaller than the first pores 22 and larger than the second pores 24 in the matrix 20. When the matrix 20 is drawn through the first slurry, the first active particles 26 get captured in the first pores 22. The matrix 20 deposited with the first active particles 26 is then dried in step S24.

In step S26, the second active particles 28 are selectively deposited in the matrix 20 by pulling the matrix 20 through the second slurry. The second particle size of the second active particles 28 in the second slurry is smaller than the second pore size of the matrix 20. Accordingly, as the matrix 20 is pulled through the second slurry, the second active particles 28 are caught in the second pores 24. The matrix 20 deposited with the first active particles 26 and the second active particles 28 is then dried in step S28.

Figure 9:
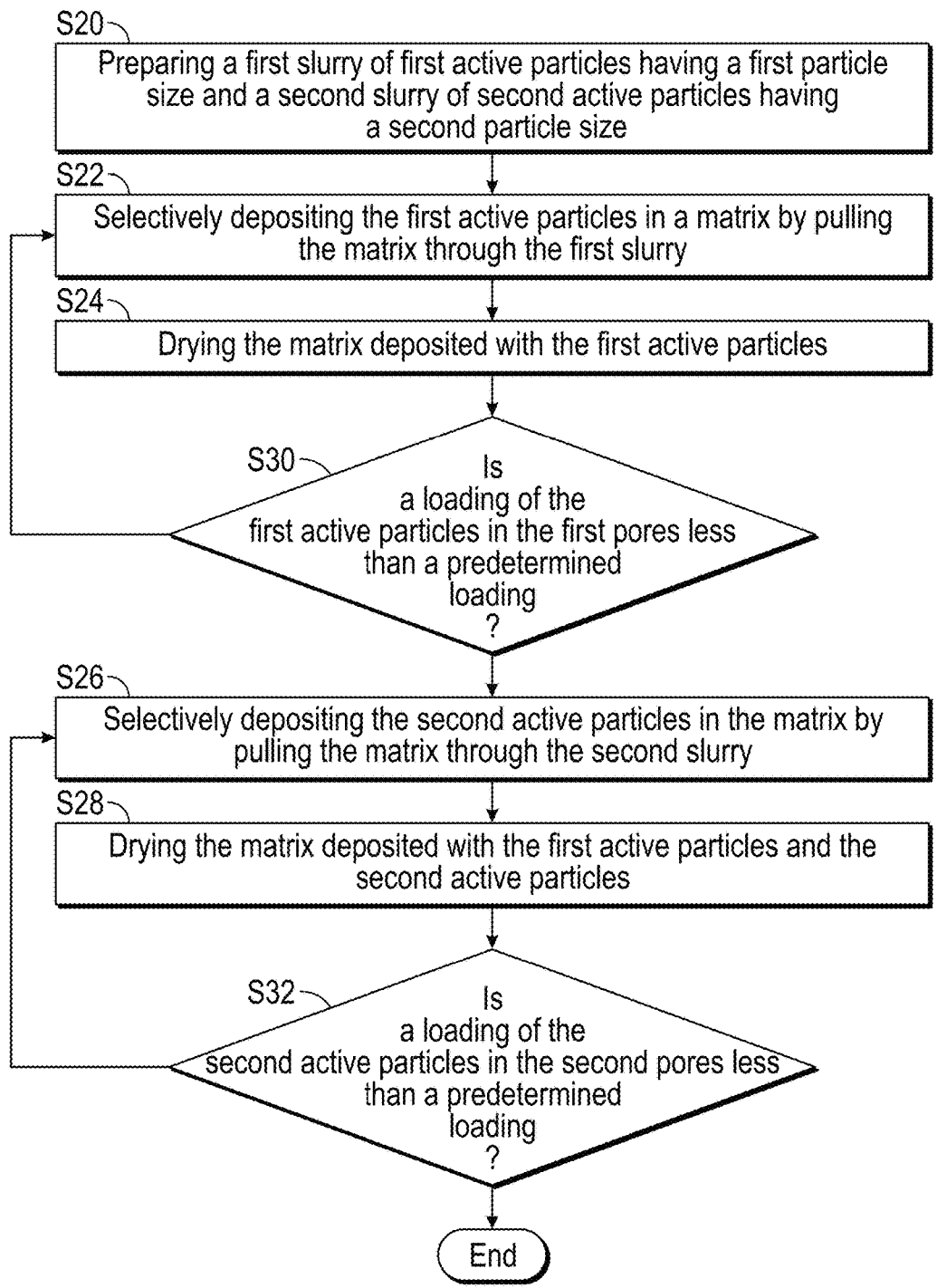
FIG. 9 is a flow diagram of another method of making the electrodes disclosed herein.

In addition to the steps discusses with reference to FIG. 8, the method can further include the steps described in FIG. 9. Note that identical steps between FIGS. 8 and 9 have the same reference numbers.

After drying the matrix 20 deposited with the first active particles 26 in step S24, a loading of the first active particles 26 in the first pores 22 can be determined in step S30. As a non-limiting example, with a known ratio of first pores 22 to second pores 24 and the weight of the matrix 20 without any particle loading, the desired loading of the first pores 22 with the first active particles 26 can be estimated by calculating the weight that the matrix 20 would be if a selected percent of the first pores 22 were loaded with the material of the first active particles 26. After steps S22 and S24, the loaded matrix 20 can be weighed. If the weight of the matrix 20 is less than a predetermined weight that equates to a predetermined loading, not enough of the first pores 22 are filled with first active particles 26. For example, if the predetermined acceptable loading is ninety-six percent, and the weight of the matrix 20 indicated that greater than ninety-six percent of the first pores 22 were filled, the method would move to step S26. If the weight of the matrix 20 indicated that less than ninety-six percent of the first pores 22 were filled, the method would repeat steps S22, S25 and S30 until the desired or required loading was obtained.

Similar to determining loading of the matrix 20 with the first active particles 26, after drying the matrix 20 deposited with the second active particles 28 in step S28, a loading of the second active particles 28 in the second pores 24 can be determined in step S32 as described above. When the loading is less than a predetermined second loading, selectively depositing of the second active particles 28 in step S26, drying of the matrix in step S28 and weighing of the matrix in step S32 are repeated.

Figure 10:
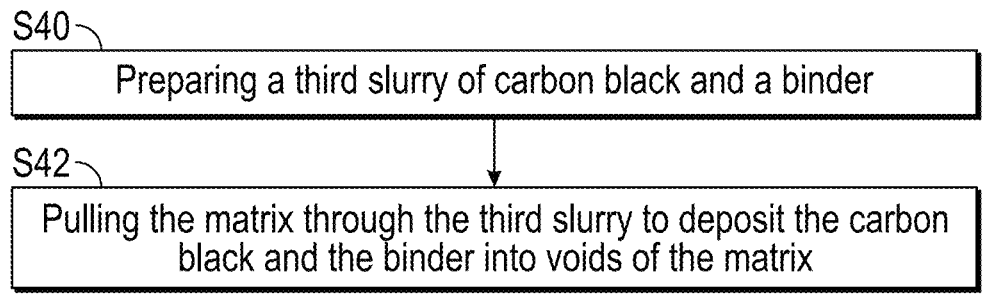
FIG. 10 is a flow diagram of additional method steps that can be included in the methods disclosed.

As shown in the flow diagram of FIG. 10, the methods herein can further comprise preparing a third slurry of carbon black and a binder in step S40 and pulling the matrix 20 through the third slurry to deposit the carbon black and the binder into voids of the matrix 20 from which the first active particles 26 and the second active particles 28 are absent.

As described herein, the methods and systems include a series of steps. Unless otherwise indicated, the steps described may be processed in different orders, including in parallel. Moreover, steps other than those described may be included in certain implementations, or described steps may be omitted or combined, and not depart from the teachings herein. The use of the term "collecting" is not meant to be limiting and encompasses both actively collecting and receiving data.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrode having a current collector and a separator, the electrode comprising:
    a matrix having first pores having a first size and second pores having a second size, the first size being larger than the second size, the second pores being uniformly distributed throughout the matrix;
    first active particles deposited in the first pores, the first active particles having a first particle size smaller than the first pores and larger than the second pores; and
    second active particles deposited in the second pores, the second active particles having a second particle size smaller than the second pores;
    wherein the matrix is a metal foam.

2. The electrode of claim 1, wherein the first active particles are graphite and the second active particles are silicon.

3. The electrode of claim 1, wherein the matrix, the first active particles and the second active particles form an active electrode layer.

4. The electrode of claim 3, wherein the matrix further forms the current collector.

5. The electrode of claim 1, wherein the metal foam is a nickel foam or a copper foam.

6. The electrode of claim 1, wherein the current collector is the matrix.

7. The electrode of claim 1, wherein the current collector comprises the matrix adjacent an active electrode layer and a solid portion opposite the active electrode layer.

8. The electrode of claim 1, further comprising:
    carbon black deposited in voids in the matrix after deposition of the first active particles and the second active particles; and
    a binder.

9. A method of preparing an electrode having selectively loaded active materials, the method comprising:
    preparing a first slurry of first active particles having a first particle size and a second slurry of second active particles having a second particle size;
    selectively depositing the first active particles in a matrix by pulling the matrix through the first slurry, the matrix including first pores having a first size and second pores having a second size, the first size being larger than the second size, the second pores being uniformly distributed throughout the matrix, wherein the first particle size of the first active particles is smaller than the first pores and larger than the second pores;
    wherein the matrix is a metal foam;
    drying the matrix deposited with the first active particles;
    selectively depositing the second active particles in the matrix by pulling the matrix through the second slurry; and drying the matrix deposited with the first active particles and the second active particles.

10. The method of claim 9 further comprising:
    after drying the matrix deposited with the first active particles, determining a loading of the first active particles in the first pores;
    when the loading is less than a predetermined first loading, repeating the selectively depositing the first active particles and drying of the matrix; and
    when the loading is greater or equal to the predetermined first loading, move to selectively depositing the second active particles.

11. The method of claim 9 further comprising:
    after drying the matrix deposited with the second active particles, determining a loading of the second active particles in the second pores; and
    when the loading is less than a predetermined second loading, repeating the selectively depositing of the second active particles and drying of the matrix.

12. The method of claim 9 further comprising:
    preparing a third slurry of carbon black and a binder;

pulling the matrix through the third slurry to deposit the carbon black and the binder into voids of the matrix where the first active particles and the second active particles are absent.

13. The method of claim 9, wherein the first active particles are graphite and the second active particles are silicon.

14. The method of claim 9, wherein the matrix, the first active particles and the second active particles form an active electrode layer.

15. The method of claim 9, further comprising:
forming the matrix by:
   forming a layout with first polymer beads of the first size and second polymer beads of the second size;
   depositing metal on the layout; and
   dissolving the first polymer beads and the second polymer beads with a solvent.

16. The method of claim 9, wherein the metal foam is a nickel foam or a copper foam.

17. The method of claim 9, wherein the current collector is the matrix.

18. The method of claim 9, wherein the current collector comprises the matrix adjacent an active electrode layer and a solid portion opposite the active electrode layer.

* * * * *